United States Patent [19]
Cotts

[11] 3,947,938
[45] Apr. 6, 1976

[54] ROLL-PELLETIZER AND ROLLS THEREFOR FOR MAKING UNIFORM PARTICLE SIZE PELLETS

[75] Inventor: Ronald F. Cotts, Norristown, Pa.

[73] Assignee: IU Conversion Systems, Inc., Philadelphia, Pa.

[22] Filed: Mar. 20, 1975

[21] Appl. No.: 560,477

Related U.S. Application Data

[62] Division of Ser. No. 435,452, Jan. 22, 1974, Pat. No. 3,890,080.

[52] U.S. Cl. ................................................ 29/127
[51] Int. Cl.² ........................................ B21B 31/08
[58] Field of Search .................. 29/127, 121 A, 132

[56] References Cited
UNITED STATES PATENTS

| | | | |
|---|---|---|---|
| 1,100,090 | 6/1914 | Parker | 29/127 |
| 1,618,704 | 2/1927 | Grupe | 29/127 X |
| 1,786,190 | 12/1930 | Busch | 29/121 H X |
| 2,530,407 | 11/1950 | Smith | 29/127 X |
| 2,793,585 | 5/1957 | Granitsas | 29/127 X |
| 3,280,516 | 10/1966 | Kimmerle | 29/127 X |
| 3,718,959 | 3/1973 | Sailas | 29/121 H |

Primary Examiner—Alfred R. Guest
Attorney, Agent, or Firm—Miller, Frailey & Prestia

[57] ABSTRACT

A roll pelletizer as disclosed and claimed in U.S. Patent Number 3,561,051 with rolls consisting of a helically wound strip of resilient material having a reduced depth portion along its length providing grooves in adjacent wraps of the strip, the remaining non-reduced depth portion of the strip defining lands. Opposed compressive rolls of this invention are helically wound with opposite hands so that lands of one roll intermesh or mate with grooves of an opposed roll. In preferred forms of this invention, a thin, non-yieldable (generally metal) strip is helically wound on a cylindrical base member with the helically wound resilient strip interposed between adjacent wraps thereof. The non-yieldable strip may include right angle tabs spaced at intervals along the length thereof which mate with spaces provided therefor in the grooved portions of the resilient strip. Uniform particle size or predetermined length pellets, of material such as synthetic aggregate made from a formable cementitious material, are manufactured by passing such material through mating helically wound rolls with such right angle tabs.

1 Claim, 6 Drawing Figures

U.S. Patent   April 6, 1976   3,947,938
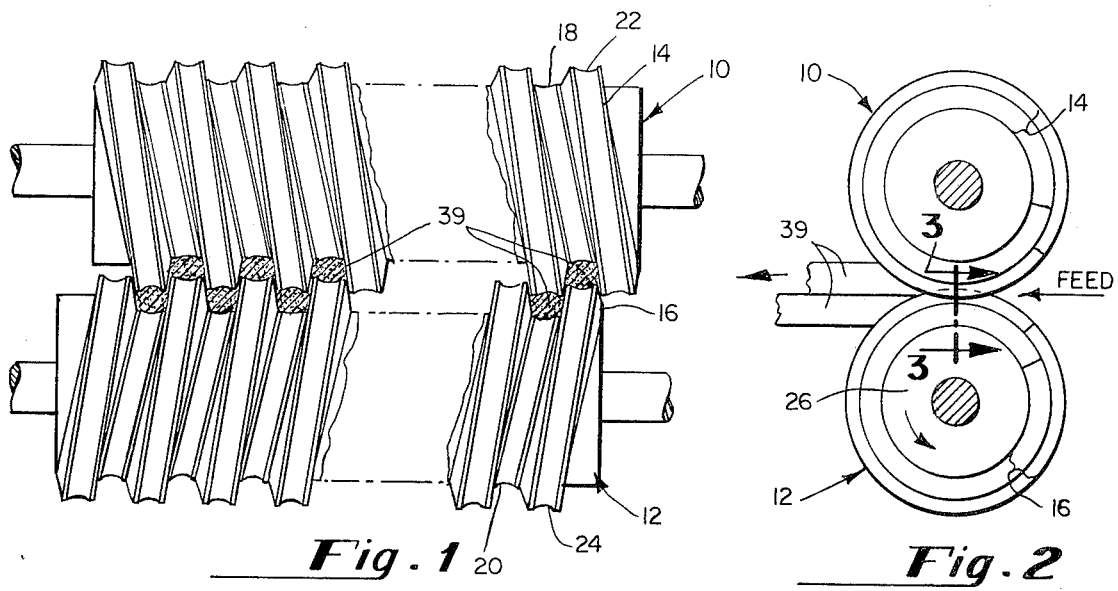
Fig. 1   Fig. 2
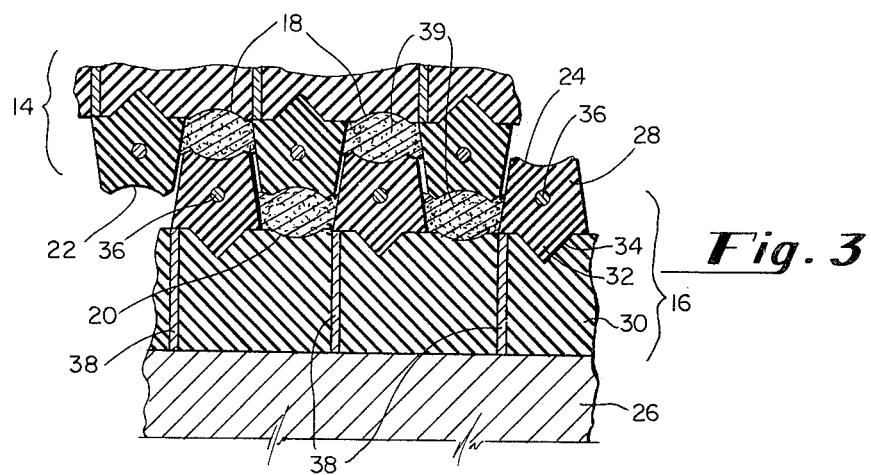
Fig. 3
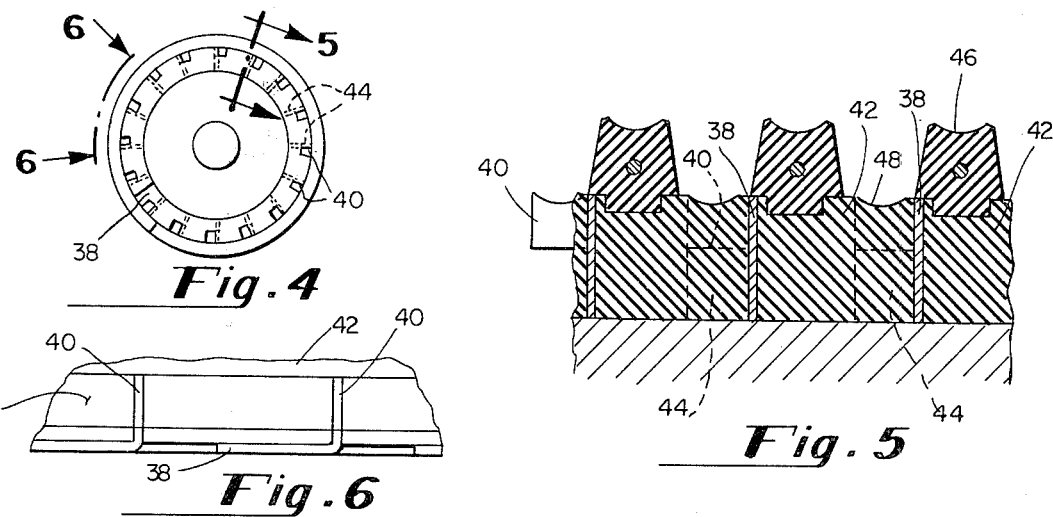
Fig. 4   Fig. 5
Fig. 6

ROLL-PELLETIZER AND ROLLS THEREFOR FOR MAKING UNIFORM PARTICLE SIZE PELLETS

This is a division of application Ser No. 435,452 filed Jan. 22, 1974 which issued as U.S. Pat. No. 3,890,080 on June 17, 1975.

This invention pertains to an improved roll pelletizer with opposed compressive rolls having lands and grooves on the surfaces thereof formed in a novel and unique manner. More particularly, this invention pertains to the improved rolls for such a roll pelletizer, the construction of the rolls facilitating both manufacture and maintenance of the pelletizer and also facilitating a novel and unique method of pelletizing to make uniform particle size materials.

A roll pelletizer of the type disclosed and claimed in U.S. Pat. No. 3,561,051, the disclosure and drawings of which are incorporated herein by reference, includes opposed compressive rolls with intermeshing lands and grooves. Plastic (i.e., formable) material to be pelletized is passed through these mating lands and grooves and compressively formed thereby into an indefinite length strip material which then breaks randomly along its length into particles of various sizes. These rolls have heretofore been made by machining grooves into a rubber surface, mounted on a cylindrical steel base member. Rolls made in this manner are expensive, difficult to manufacture and require replacement of the whole roll in the case of any serious damage.

Having in mind these problems, the general objective of the present invention is to provide compressive rolls, for roll pelletizers of the type referred to, which are easier to manufacture and more convenient to repair or replace in the case of serious damage.

It is a further object of this invention to provide such rolls which more readily produce pellets of uniform or predetermined length or particle size.

Still further, it is an object of this invention to provide such rolls, the construction of which inherently facilitates the manufacture of specific land and groove configurations designed to tailor the rolls for specific pelletizing operation.

These and other objects, which will become apparent in the course of the subsequent description of the invention, are met by such roll pelletizers wherein the lands and grooves of the yieldable surface of the rolls are defined by a helically wound resilient strip, the strip including a reduced depth portion (running lengthwise) to define grooves and a nonreduced depth portion to define lands in the roll surfaces. Generally, the resilient strip is wrapped with adjacent wraps abutting one another, except in those emobodiments of the present invention wherein a helically wound thin metal strip is interposed between adjacent wraps to provide better pellet definition in the extruding operation of the pellets and also to better locate the resilient strip on the base member of the rolls.

Opposed rolls include helically wound strips of opposite hands so that the lands of one roll mate with the grooves of the opposed roll.

In a preferred form of this invention, the thin metal strip interposed between adjacent or successive wraps of the resilient strip includes right angle tabs mounted at spaced intervals thereon and fitting into slots provided for the tabs in groove portions of the resilient strip to provide indentations at spaced intervals along the length of the material formed between mating lands and grooves of the opposed rolls. Upon leaving the rolls, the continuous length of formed plastic material from these rolls tends to break at the points of indentation, thus producing pellets of predetermined or relatively uniform particle size.

This invention may be better understood by reference to the following detailed description of the invention, taken in conjunction with the appended claims and the accompanying drawings, in which:

FIG. 1 is a view of opposed compressive rolls with helically wound resilient strips and forming mating lands and grooves;

FIG. 2 is an end view of the rolls shown in FIG. 1;

FIG. 3 is a detailed sectional view, in cross-section, of the helical windings of the rolls shown in FIGS. 1 and 2;

FIG. 4 is an end view of a roll in accordance with another embodiment of this invention; and FIGS. 5 and 6 are detailed sectional views of a helically wound resilient strip showing certain improved features in this specific embodiment of this invention.

Referring more specifically to FIGS. 1 and 2, there is shown opposed rolls 10 and 12, each with helically wound resilient strips, 14 and 16 (the helical winding being of opposite hand on the two rolls). In each case, the helically wound strip includes a recessed or reduced depth portion 18 and 20 (running lengthwise of the strips) defining grooves on the surfaces of rolls 10 and 12 between lands 22 and 24 defined by the non-reduced depth portions of resilient strips 14 and 16. It will be noted that lands 22 and 24 on each of the rolls 10 and 12 mate with and fit into grooves 18 and 20 of the opposite roll.

Rolls of the type shown in FIGS. 1 and 2 may be used in a pelletizer of the type disclosed in U.S. Pat. No. 3,561,051. These rolls, however, are relatively easy to manufacture and repair and the cross-sectional shape of strips 14 and 16 may be specifically adapted, with tapered side walls, etcetera, to specific applications, materials, etcetera.

In FIG. 3, the construction of the rolls shown in FIGS. 1 and 2 is seen in somewhat more detail in enlarged cross-sectional view. Here, the roll is seen to include a base member 26, which would ordinarily be a steel cylinder with an axial shaft or shaft mounting. Affixed to base member 26 is helically wound resilient strip 16. While strip 16 (and corresponding strip 14 on roll 10) may be a single piece, it is comprised in the preferred embodiment of the present invention shown in FIG. 3, of two resilient sub-strips, one of which 28 is narrower and overlies a wider sub-strip 30. The two sub-strips 28 and 30 may be of the same or different resiliency depending on the material being formed, the cross-sectional shape desired, the respective wear characteristics of the two sub-strips in particular applications, etcetera.

Sub-strips 28 and 30 may be secured and aligned to one another and to base member 26 in any of a variety of ways, including, for example, mechanically mating configurations, such as the protrusion 32 and indentation 34 seen in FIG. 3. In addition, chemical bonding such as epoxies or polybutadiene resins may be used to secure these elements.

Still further, it should be noted that resilient strips 14 and 16 or sub-strips 28 and 30 may also include a reinforcing member, such as continuous wire reinforcement 36 seen in FIG. 3.

Also seen in FIG. 3 is a thin metal strip or ribbing 38 (which could equally well be any other non-yieldable material) which is also wound helically on base member 26 and is interposed between successive wraps of resilient strip 16. The heighth of ribbing 38 may be any heighth up to that of reduced depth portion 30 of strip 16.

Generally, thin metal strip or ribbing 38 provides a lateral reinforcement for resilient strip 16, serves to establish and maintain the lateral location of resilient strip 16 on base member 26 and, in the pelletizing or forming operation, facilitates producing well-defined side-walls along the length of the formed material.

Also seen in FIG. 3 is material 39 as it is formed between the mating lands 22, 24 and grooves 18 and 20 of rolls 10 and 12.

As mentioned above and as better illustrated in FIG. 3, it should be noted that for specific materials to be formed and pelletized, the cross-sectional shape of the formed strip may be controlled by the cross-sectional configuration of mating lands 22, 24 and grooves 18 and 20, including the side-wall taper, the top surface configuration of lands 22 and 24 and the top surface configuration of grooves 18 and 20.

Generally, resilient sub-strips 28 and 30 (and the corresponding sub-strips on roll 10) may be formed from an elastomeric material such as a synthetic rubber. In wrapping these resilient strips on base member 26, they will, of course, first be anchored at one end of base member 26 and then wrapped helically and secured or bonded to base member 26 throughout their length until the other end of base member 26 is reached.

In such wrapping, the resilient stripping will be laid so that successive wraps abut one another, except in those embodiments of the invention, as in FIG. 3, wherein thin metal strip 38 or ribbing is interposed between adjacent wraps.

In making rolls of the type shown in FIG. 3, or in refurbishing such rolls with new resilient surfaces, the thin metal strip 28 or ribbing, if not already in place is first wrapped helically on base member 26 and secured thereto, such as by welding. In such helical wrapping, the pitch of the helical wrap is pre-determined so that the distance between successive wraps equals the width of the resilient strip to be mounted therein. The resilient strip is then helically wound as heretofore described.

In one particular embodiment of the present invention, as shown in FIGS. 4-6, thin metal strip 38 or ribbing is provided with right angle tabs 40, at spaced intervals along its length. Tabs 40 are formed of a non-yieldable material, such as steel. In this embodiment of the present invention, resilient sub-strip 42 is provided with cuts or grooves 44 at right angles to and at spaced intervals along its length corresponding to the intervals between tabs 40. In mounting resilient sub-strip 42, on the cylindrical base member, tabs 40 extend into slots 44.

In the process of forming a plastic or formable material, such as in forming a lime-fly ash cementitious mixture to produce synthetica aggregate, the material formed passes between the intermeshing or mating lands 46 and grooves 48 of opposed compressisve rolls and is formed into a continuous shape of indefinite length having a cross-section defined by the geometric configuration of these opposed lands and grooves. In addition, this formed shape is provided with indentations molded at spaced intervals along the length thereof by tabs 40. This continuous shape then, as it leaves the opposed compressive rolls and as it is forced off tabs 40, breaks at these indentations to provide particles of predetermined, generally uniform, length or size.

While this invention has been described with respect to specific embodiments thereof, it should be understood that it is not limited thereto, as numerous other forms and variations will be apparent to those skilled in the art to which this invention pertains. The appended claims are intended, therefore, to encompass all such forms of this invention, whether or not specifically disclosed, which are within its true spirit and scope.

I claim:

1. A compressive roll consisting of a cylindrical base member with a thin, continuous, non-yieldable strip of predetermined depth wound helically thereon and secured thereto, further including a continuous resilient strip helically wound thereon between successive wraps of said non-yieldable strip, the width of said resilient strip corresponding to the space between adjacent wraps of said non-yieldable strip, said resilient strip having in part of its width along the length thereof a reduced depth portion, the heighth of which is not less than that of a said non-yieldable strip.

* * * * *